(12) United States Patent
Kim et al.

(10) Patent No.: US 12,455,497 B2
(45) Date of Patent: Oct. 28, 2025

(54) CAMERA MODULE

(71) Applicant: Samsung Electro-Mechanics Co., Ltd., Suwon-si (KR)

(72) Inventors: Janghun Kim, Suwon-si (KR); Manseok Kim, Suwon-si (KR); Jinhyeok Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 378 days.

(21) Appl. No.: 18/198,131

(22) Filed: May 16, 2023

(65) Prior Publication Data

US 2024/0004268 A1     Jan. 4, 2024

(30) Foreign Application Priority Data

Jun. 30, 2022 (KR) .................. 10-2022-0080824

(51) Int. Cl.
    *G03B 17/12*      (2021.01)
    *G02B 7/02*      (2021.01)
    *G03B 17/17*      (2021.01)

(52) U.S. Cl.
    CPC ............. *G03B 17/12* (2013.01); *G02B 7/021* (2013.01); *G03B 17/17* (2013.01)

(58) Field of Classification Search
    CPC ......... G03B 17/12; G03B 17/17; G02B 7/021
    USPC ....................................................... 359/726
    See application file for complete search history.

(56) References Cited

U.S. PATENT DOCUMENTS

| | | |
|---|---|---|
| 8,836,830 B2 | 9/2014 | Peng et al. |
| 2016/0119545 A1 | 4/2016 | Shimizu et al. |
| 2016/0142599 A1 | 5/2016 | Shimizu et al. |
| 2019/0174623 A1 | 6/2019 | Owaki |
| 2021/0258459 A1 | 8/2021 | Zhang |

(Continued)

FOREIGN PATENT DOCUMENTS

| | | |
|---|---|---|
| KR | 10-2021-0116163 A | 9/2021 |
| KR | 10-2022-0030126 A | 3/2022 |
| WO | WO 2015/015999 A1 | 2/2015 |

(Continued)

OTHER PUBLICATIONS

Korean Office Action issued on Oct. 11, 2024, in counterpart Korean Patent Application No. 10-2022-0080824 (1 page in English, 2 pages in Korean).

(Continued)

*Primary Examiner* — William Choi
(74) *Attorney, Agent, or Firm* — NSIP Law

(57) ABSTRACT

A camera module includes a housing; cover covering the housing and including a protrusion guide on a side wall of the cover; a folded module disposed in the housing and configured to reflect incident light; a lens module through which the reflected light passes disposed in the housing; an image sensor module mounted on the housing and configured to detect the light passing through the lens module; a reinforcing plate disposed on an outer surface of the side wall of the cover so that one edge of the reinforcing plate is adjacent to the protrusion guide; and a module circuit board disposed outside the housing and including a connection portion connected to the image sensor module, and a fixing substrate connected to the connection portion and disposed on the reinforcing plate, wherein the connection portion is bent to enable the fixing substrate to be disposed on the reinforcing plate.

25 Claims, 12 Drawing Sheets

(56) References Cited

U.S. PATENT DOCUMENTS

2021/0286193 A1     9/2021    Kwon et al.
2022/0066291 A1     3/2022    Hong

FOREIGN PATENT DOCUMENTS

WO    WO 2015/016043 A1    2/2015
WO    WO 2018/047491 A1    3/2018

OTHER PUBLICATIONS

Korean Office Action issued on Feb. 28, 2024, in counterpart Korean Patent Application No. 10-2022-0080824 (6 pages in English, 6 pages in Korean).

IV-IV'

VIII-VIII'

XI-XI'

CAMERA MODULE

CROSS-REFERENCE TO RELATED APPLICATIONS

This application claims the benefit under 35 USC 119(a) of Korean Patent Application No. 10-2022-0080824 filed on Jun. 30, 2022, in the Korean Intellectual Property Office, the entire contents of which are incorporated herein by reference for all purposes.

BACKGROUND

1. Field

The present disclosure relates to a camera module.

2. Description of Related Art

A camera module has become a basic feature in portable electronic devices such as smart phones, tablet PCs, and laptop computers, and its application range is gradually increasing. As the portable electronic devices are down-sized and thinned according to market demands, the camera module applied thereto is also required to be down-sized and thinned.

Apart from the down-sizing and thinning requirements thereof, there is also a demand for improvements in the performance of the camera module, and for this purpose, an auto focus function, a zoom function, a shake (hand shake) correction function, and other functions are added thereto, but there is a limit to down-sizing and thinning the camera module based on an existing structure.

Recently, in order to solve this problem, a camera module including a folded module in which a plurality of lenses are arranged in a longitudinal direction or a width direction rather than a thickness direction of the portable electronic device and that changes a path of incident light by using a reflective member has been proposed.

The above information disclosed in this Background section is only for enhancement of understanding of the background of the described technology, and therefore it may contain information that does not constitute prior art that is already known to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing including an inner space; a cover covering the housing and including a side wall covering a side surface of the housing, and a protrusion guide protruding outward from the side wall of the cover; a folded module disposed in the inner space of the housing and including a reflective member configured to change a path of light incident from outside the camera module in a light incidence direction by reflecting the light in an optical axis direction in the inner space of the housing; a lens module disposed in the inner space of the housing and including a lens barrel, and a plurality of lenses disposed in the lens barrel and arranged in the optical axis direction so that the light reflected by the reflective member in the optical axis direction in the inner space of the housing passes through the plurality of lenses; an image sensor module mounted on the housing and including an image sensor configured to detect the light passing through the plurality of lenses; a reinforcing plate disposed on an outer surface of the side wall of the cover so that one edge of the reinforcing plate is adjacent to the protrusion guide; and a module circuit board disposed outside of the housing and including a connection portion connected to the image sensor module, and a fixing substrate connected to the connection portion and disposed on the reinforcing plate so that the reinforcing plate is interposed between the fixing substrate and the outer surface of the side wall of the cover, wherein the connection portion is bent to enable the fixing substrate to be disposed on the reinforcing plate.

The cover may be a metal shield can.

The protrusion guide may be formed by bending one edge of a cutout partly cut out of the side wall of the metal shield can to protrude outward from the side wall of the metal shield can.

The reinforcing plate may be a rigid metal plate.

The camera module may further include a conductive adhesive disposed between the reinforcing plate and the outer surface of the side wall of the metal shield can to adhere the reinforcing plate to the outer surface of the side wall of the metal shield can and ground the module circuit board to the metal shield can.

The protrusion guide protruding outward from the side wall of the cover may be spaced apart from the image sensor module in the optical axis direction, and the fixing substrate may be disposed on the outer surface of the side wall of the cover between the image sensor module and the protrusion guide.

The reinforcing plate may include a first edge parallel to the light incidence direction and adjacent to the connection portion; and a second edge parallel to and facing the first edge and adjacent to the protrusion guide.

The housing may include a boss pin protruding through a cutout partially cut out of the side wall of the cover, and the reinforcing plate may include a pin fixing groove accommodating the boss pin.

The reinforcing plate may include a first edge parallel to the light incidence direction and adjacent to the connection portion; a second edge parallel to and facing the first edge; and a guide groove formed in the second edge, recessed toward a center of the reinforcing plate in a planar direction of the reinforcing plate perpendicular to the light incidence direction, and accommodating the protrusion guide.

A length of the protrusion guide parallel to the light incidence direction may be shorter than a length of the second edge parallel to the light incident direction.

In another general aspect, a camera module includes a housing including an inner space; a cover covering the housing and including a side wall covering a side surface of the housing, and a protrusion guide protruding outward from the side wall of the cover; a folded module disposed in the inner space of the housing and including a reflective member configured to change a path of light incident from outside the camera module in a light incidence direction by reflecting the light in an optical axis direction in the inner space of the housing; a lens module disposed in the inner space of the housing and including a lens barrel, and a plurality of lenses disposed in the lens barrel and arranged in the optical axis direction so that the light reflected by the reflective member in the optical axis direction in the inner space of the housing passes through the plurality of lenses; an image sensor module mounted on the housing and including an image sensor configured to detect the light passing through the plurality of lenses; and a module circuit board disposed outside of the housing and including a connection portion connected to the image sensor module, and a fixing substrate connected to the connection portion and disposed on an outer surface of the side wall of the cover, wherein the connection portion is bent to enable the fixing substrate to be disposed on the outer surface of the side wall of the cover, and the fixing substrate includes a guide groove formed in one edge of the fixing substrate and accommodating the protrusion guide.

The cover may be a metal shield can.

The protrusion guide may be formed by bending one edge of a cutout partly cut out of the side wall of the metal shield can to protrude outward from the side wall of the metal shield can.

The fixing substrate may include a ground pattern exposed on a surface of the fixing substrate facing the outer surface of the side wall of the metal shield can, and the camera module may further include a conductive adhesive disposed between the ground pattern and the outer surface of the side wall of the metal shield can to adhere the fixing substrate to the outer surface of the side wall of the metal shield can and ground the module circuit board to the metal shield can.

The fixing substrate may include a third edge parallel to the light incidence direction and adjacent to the connection portion: and a fourth edge parallel to and facing the third edge, wherein the guide groove may be formed in the fourth edge and recessed toward a center of the fixing substrate in a planar direction of the fixing substrate perpendicular to the light incidence direction.

The camera module may further include a rigid reinforcing plate disposed on a surface of the fixing substrate facing away from the outer surface of the side wall of the cover.

In another general aspect, a camera module includes a housing including an inner space; a cover covering the housing and including a side wall covering a side surface of the housing, and a protrusion guide protruding outward from the side wall of the cover; a folded module disposed in the inner space of the housing and including a reflective member configured to change a path of light incident from outside the camera module in a light incidence direction by reflecting the light in an optical axis direction in the inner space of the housing; a lens module disposed in the inner space of the housing and including a lens barrel, and a plurality of lenses disposed in the lens barrel and arranged in the optical axis direction so that the light reflected by the reflective member in the optical axis direction in the inner space of the housing passes through the plurality of lenses; an image sensor module mounted on the housing and including an image sensor configured to detect the light passing through the plurality of lenses; and a module circuit board disposed outside of the housing and including a connection portion connected to the image sensor module, and a fixing substrate connected to the connection portion and supported on an outer surface of the side wall of the cover at a position determined by the protrusion guide, wherein the connection portion is bent to enable the fixing substrate to be supported on the outer surface of the side wall of the cover.

The camera module may further include a reinforcing plate disposed between the fixing substrate and the outer surface of the side wall of the cover, wherein the fixing substrate may be disposed on the reinforcing plate.

The camera module may further include a conductive adhesive adhering the reinforcing plate to the outer surface of the side wall of the cover.

The housing may include a boss pin protruding through a cutout partially cut out of the side wall of the cover, the reinforcing plate may include a pin fixing groove formed in an edge of the reinforcing plate parallel to the light incidence direction and accommodating the boss pin, and a width of the pin fixing groove in a direction parallel to the light incidence direction may be greater than a width of the boss pin in the direction parallel to the light incidence direction and less than a length of the protrusion guide in the direction parallel to the light incidence direction.

The reinforcing plate may include a guide groove formed in an edge of the reinforcing plate parallel to the light incidence direction and accommodating the protrusion guide, and a width of the guide groove in a direction parallel to the light incidence direction may be greater than a length of the protrusion guide in the direction parallel to the light incidence direction and less than a length of the reinforcing plate in the direction parallel to the light incidence direction.

The fixing substrate may include a guide groove formed in an edge of the fixing substrate parallel to the light incidence direction and accommodating the protrusion guide, and a width of the guide groove in a direction parallel to the light incidence direction may be greater than a length of the protrusion guide in the direction parallel to the light incidence direction and less than a length of the fixing substrate in the direction parallel to the light incidence direction.

The camera module may further include a conductive adhesive adhering the fixing substrate to the outer surface of the side wall of the cover.

The fixing substrate may include a ground pattern exposed on a surface of the fixing substrate facing the outer surface of the side wall of the cover, and the conductive adhesive may adhere the ground pattern to the outer surface of the side wall of the cover.

The camera module may further include a rigid reinforcing plate disposed on a surface of the fixing substrate facing away from the outer surface of the side wall of the cover.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
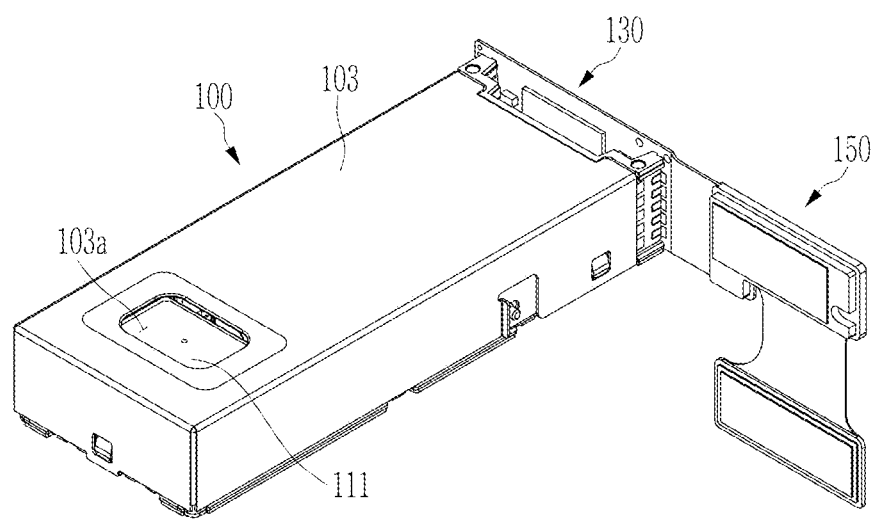
FIG. 1 illustrates a perspective view of an appearance of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The phrase "in a plan view" or "on a plane" means viewing a target portion from the top, and the phrase "in a cross-sectional view" or "on a cross-section" means viewing a cross-section formed by vertically cutting a target portion from the side.

Figure 2:
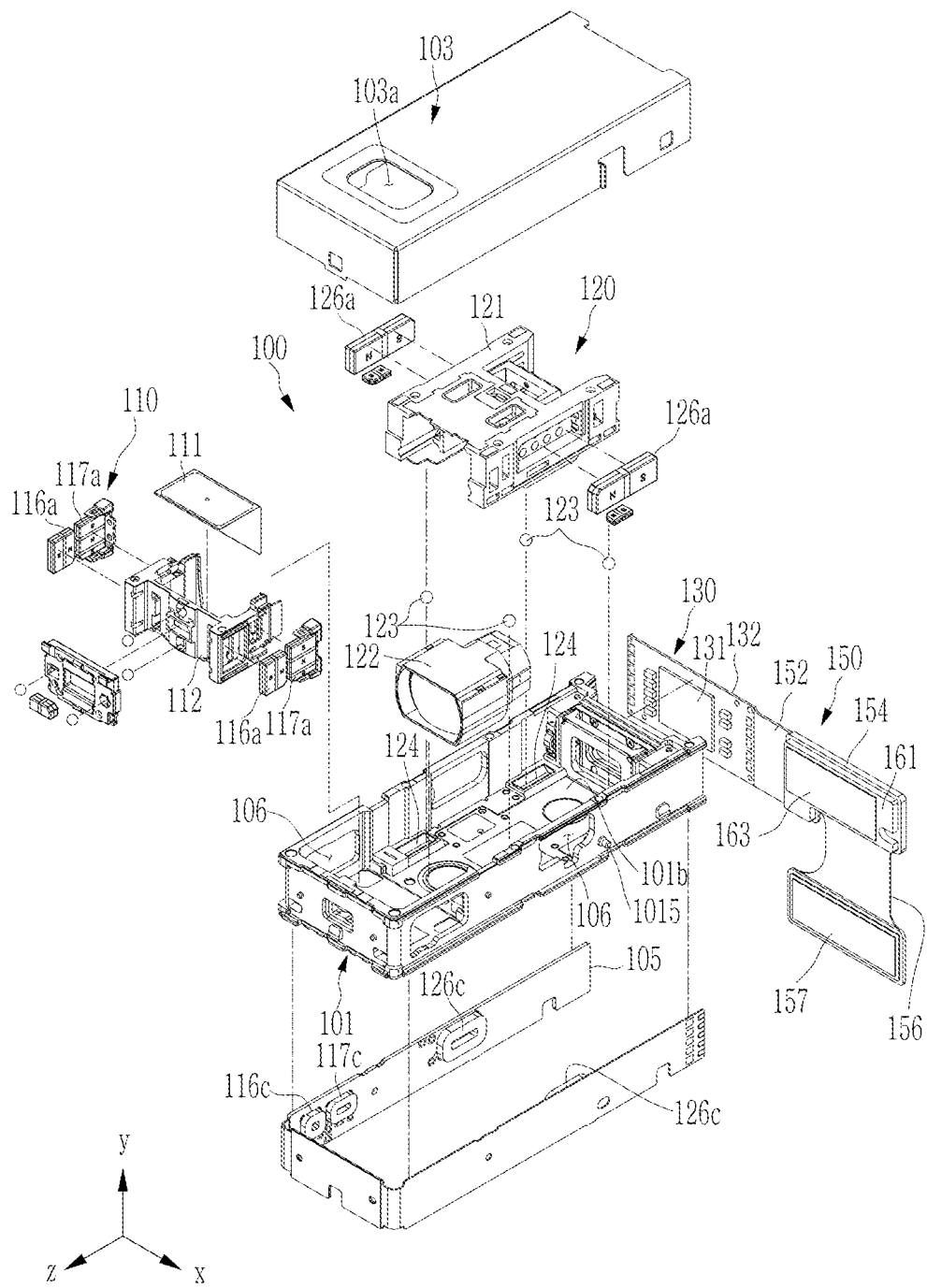
FIG. 2 illustrates a schematically exploded perspective view of the camera module illustrated in FIG. 1.

FIG. 1 illustrates a perspective view of an appearance of a camera module according to an embodiment, and FIG. 2 illustrates a schematically exploded perspective view of the camera module illustrated in FIG. 1.

Referring to FIG. 1 and FIG. 2, a camera module 100 according to the present embodiment may include a folded module 110, a lens module 120, and an image sensor module 130. The folded module 110 and the lens module 120 are accommodated in an inner space of a housing 101. A cover 103 partially surrounds upper and side surfaces of the housing 101, and partially forms an exterior of the camera module 100. The cover 103 may be a metal shield can.

The folded module 110 may be configured to change a path of light entering from the outside. Incident light entering the camera through an opening 103a of the cover 103 may be reflected toward the lens module 120 by the folded module 110. In the present embodiment, the folded module 110 includes a reflective member 111, and the reflective member 111 may be provided in a form of, for example, a prism or a mirror.

The lens module 120 includes a carrier 121 movably provided in the inner space of the housing 101 in an optical axis (z-axis in the drawing) direction, and a lens barrel 122 fixed to the carrier 121 and having at least one lens therein. The light reflected from the folded module 110 is refracted while passing through the lens module 120. The light passing through the lens module 120 is incident on an image sensor 131. When the lens module includes a plurality of lenses, the plurality of lenses may be arranged in the optical axis direction.

The camera module 100 according to the present embodiment may provide an auto focus (AF) function and an optical image stabilization (OIS) function. Hereinafter, examples of structures of an AF driver and an OIS driver implementing the AF function and the OIS function will be described with reference to the drawings. However, the AF function and the OIS function may be implemented by known various structures of the AF driver and the OIS driver, and the present embodiment is not limited thereto.

The lens module 120 may reciprocate along the optical axis to adjust a focal distance or implement the zoom function. The AF driver may be disposed at a side portion of the lens module 120. In the present embodiment, an AF magnet 126a may be installed in the lens module 120, and an AF coil 126c may be disposed at a position opposite to the AF magnet 126a. The lens module 120 may move along the optical axis by an electromagnetic interaction between the AF coil 126c and the AF magnet 126a. The AF coil 126c may be mounted on a substrate 105 that is attached to the housing 101, and the housing 101 may have an opening 106 so that the AF coil 126c and the AF magnet 126a may face each other.

For smooth driving, ball members 123 may be disposed between the lens module 120 and a bottom surface 101b of the housing 101. The lens module 120 and the bottom surface 101b of the housing 101 may include guide grooves 124 for partially accommodating the ball members 123. The guide grooves 124 extend in a direction parallel to the optical axis, and a movement direction of the ball members 123 is limited to a movement direction of the guide groove 124 (that is, the optical axis direction).

The OIS function may be implemented by rotating the folded module 110 about an axis perpendicular to the optical axis. For example, when the optical axis is referred to as a first axis, the first axis may be parallel to the z-axis of the drawing, a second axis may be an axis perpendicular to the optical axis and parallel to the incident light and may be parallel to the y-axis of the drawing, and a third axis may be an axis perpendicular to the optical axis and the second axis and may be parallel to the x-axis of the drawing.

The folded module 110 may include an OIS driver configured to rotate the reflective member 111 with respect to the housing 101 about the second axis and the third axis that are perpendicular to the optical axis. The OIS driver may include a first OIS driver configured to rotate the reflective member 111 about the second axis perpendicular to the optical axis, and a second OIS driver configured to rotate the reflective member 111 about the third axis perpendicular to the optical axis and orthogonal to the second axis.

The OIS driver rotates the reflective member 111 around the second axis and/or the third axis so that shaking of the image formed on the image sensor 131 due to the shaking of the camera module 100 may be optically corrected.

The first OIS driver may be disposed at both sides of a movable holder 112. The first OIS driver may include a first OIS magnet 116a mounted on both sides of the movable holder 112 and a first OIS coil 116c disposed at a portion facing the first OIS magnet 116a. The first OIS coil 116c is fixedly coupled to the housing 101, and due to an electromagnetic interaction between the first OIS coil 116c and the first OIS magnet 116a, the movable holder 112 may rotate with respect to the housing 101 about the second axis perpendicular to the optical axis.

In addition, the second OIS driver may be disposed adjacent to the first OIS driver at both sides of the movable holder 112. The second OIS driver may include a second OIS magnet 117a mounted on both sides of the movable holder 112 and a second OIS coil 117c disposed at a portion facing the second OIS magnet 117a. The second OIS coil 117c is fixedly coupled to the housing 101, and due to an electromagnetic interaction between the second OIS coil 117c and the second OIS magnet 117a, the movable holder 112 may rotate with respect to the housing 101 about the third axis perpendicular to the optical axis.

The first OIS coil 116c and the second OIS coil 117c are attached to the substrate 105, and the substrate 105 is fixed to the housing 101. The housing 101 may include openings 106 so that the first OIS coil 116c and the first OIS magnet 116a may face each other, and the second OIS coil 117c and the second OIS magnet 117a may face each other.

The image sensor module 130 may include the image sensor 131 and a substrate 132 on which the image sensor 131 is mounted. An image is formed on an image forming surface (or an upper surface) of the image sensor 131, and in response to this, the image sensor 131 generates an image signal of the formed image, and the image signal may be transmitted to an external circuit through the substrate 132. The image sensor module 130 may be fixed to the housing 101 through the substrate 132.

The image sensor module 130 may be connected to a module circuit board 150 extending outside the housing 101 for connection to an external circuit or device. The module circuit board 150 includes a connection portion 152 and a fixing substrate 154, and the connection portion 152 may be connected to the image sensor module 130, and the fixing substrate 154 may be attached to an outer surface of the cover 103 covering the outside of the housing 101.

Hereinafter, the configuration and attachment structure of the module circuit board 150 according to the present embodiment will be described in more detail with reference to FIG. 3 to FIG. 5.

Figure 3:
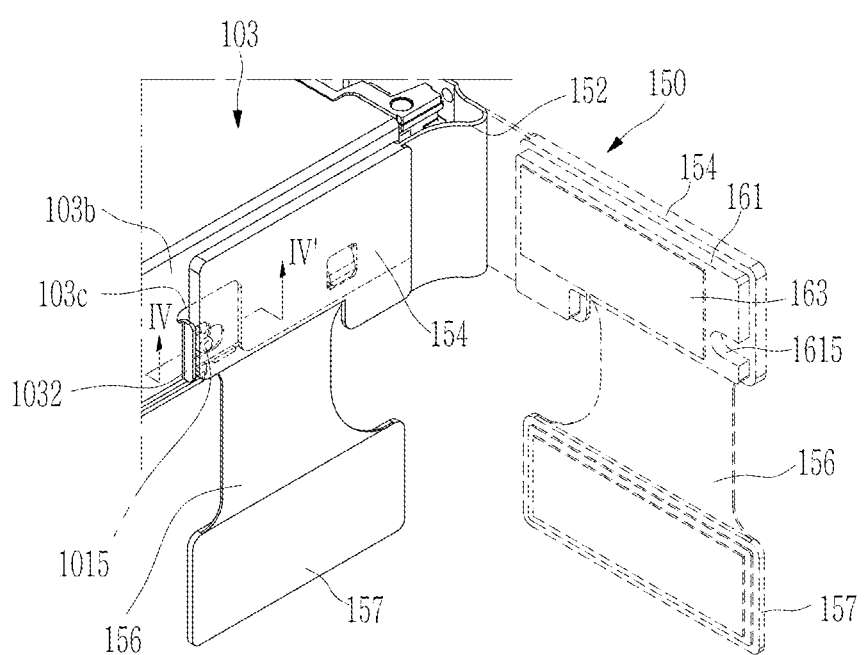
FIG. 3 illustrates a partial perspective view of a state in which a module circuit board of the camera module shown in FIG. 1 is attached to a cover.
Figure 4:
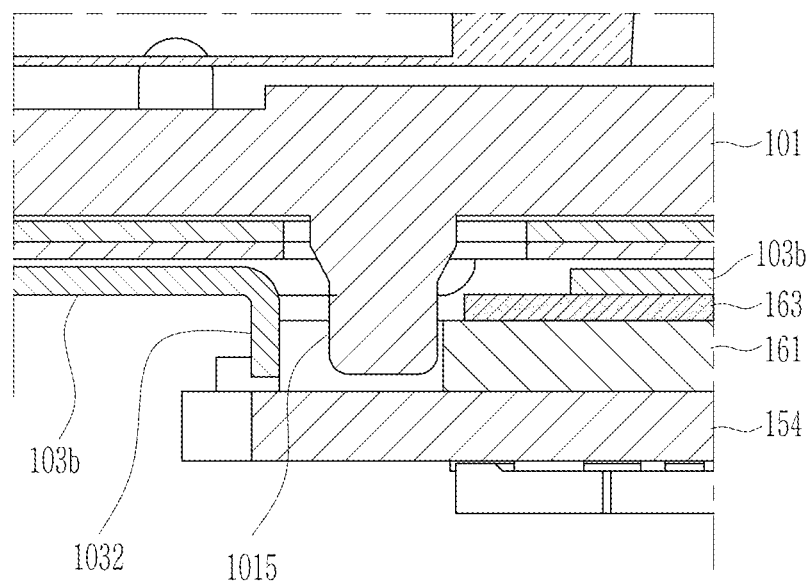
FIG. 4 illustrates a cross-sectional view taken along line IV-IV' of FIG. 3.

FIG. 3 illustrates a partial perspective view of a state in which a module circuit board of the camera module shown in FIG. 1 is attached to a cover, and FIG. 4 illustrates a cross-sectional view taken along line IV-IV' of FIG. 3.

Referring to FIG. 3 and FIG. 4, in the camera module 100 according to the present embodiment, the module circuit board 150 may be extended from the image sensor module 130 to be fixed to the outer surface of the cover covering the outside of the housing 101, and may be further extended to be connected to an external circuit or device.

That is, the module circuit board 150 includes the connection portion 152 and the fixing substrate 154 that are connected to each other, and in this case, the connection portion 152 may be connected to the substrate 132 of the image sensor module 130, and the fixing substrate 154 may be fixed to an outer surface of the cover 103 covering the outside of the housing 101. In addition, the module circuit board 150 may include a flexible circuit portion 156 extending from the fixing substrate 154 and a connector substrate 157 connected thereto to be connected to an external circuit or device (not shown). The external circuit or device may be a circuit connected to electronic components in an electronic device in which the camera module 100 according to the present embodiment is mounted.

The cover 103 includes a side wall 103b covering a side surface of the housing 101, and a protrusion guide 1032 may be formed to protrude outward from the side wall 103b. The cover 103 may be a metal shield can, and the protrusion guide 1032 may be formed by bending one edge of a cutout 103c partially cut out of the side wall 103b of the metal shield can to the outside.

The fixing substrate 154 of the module circuit board 150 may be attached to an outer surface of the side wall 103b of the cover 103 by bending the connection portion 152, and in this case, a reinforcing plate 161 may be interposed between the fixing substrate 154 and the outer surface of the side wall 103b of the cover 103. The reinforcing plate 161 may be made of a rigid metal plate and fixed to one surface of the fixing substrate 154, and a conductive adhesive 163 may be disposed on one surface of the reinforcing plate 161 facing the side wall 103b of the cover 103. Accordingly, the fixing substrate 154 may be attached by the conductive adhesive 163 by interposing the reinforcing plate 161 between the fixing substrate 154 and the outer surface of the cover 103 that is a metal shield can so that a ground connection of the module circuit board 150 may be made.

The protrusion guide 1032 may be disposed on the side wall 103b of the cover 103 and spaced apart from the image sensor module 130 in the optical axis direction, and in this case, the protrusion guide 1032 may be configured to be adjacent to one edge of the reinforcing plate 161. The reinforcing plate 161 includes a first edge that is parallel to the light incident direction (the second axis direction, the y-axis direction of the drawing) and is adjacent to the connection part 152, and a second edge that is parallel to and faces the first edge. When the fixing substrate 154 is attached to the outer surface of the side wall 103b of the cover 103, the second edge of the reinforcing plate 161 may be installed to be adjacent to the protrusion guide 1032. Accordingly, the fixing substrate 154 of the module circuit board 150 may be disposed between the image sensor module 130 and the protrusion guide 1032. Thus, the protrusion guide 1032 may be utilized to guide a fixing position of the fixing substrate 154.

On the other hand, the housing 101 may include a boss pin 1015 protruding outward, and the boss pin 1015 may be exposed to the outside through the cutout 103c partially cut out of the side wall 103b of the cover 103. A height at which the boss pin 1015 protrudes outward may be set to protrude more than the outer surface of the side wall 103b of the cover 103, and the protruding height may be set at about the same level as the protrusion guide 1032 of the cover 103.

The reinforcing plate 161 may include a pin fixing groove 1615 to be able to accommodate the boss pin 1015. That is, when the fixing substrate 154 is attached to the outer surface of the side wall 103b of the cover 103, the boss pin 1015 may be inserted into the pin fixing groove 1615. The pin fixing groove 1615 may be formed to be concave from the second edge of the reinforcing plate 161 toward a center of the reinforcing plate 161 in a planar direction, and may have a greater opening width than a lateral cross-section diameter of the boss pin 1015. Thus, the boss pin 1015 may be utilized to guide the fixing position of the fixing substrate 154 together with the protrusion guide 1032. The planar direction may be set as a direction parallel to a surface of the reinforcing plate 161.

In addition, a planar area of the reinforcing plate 161 is formed to be smaller than that of the fixing substrate 154, and thus, by interposing the reinforcing plate 161, when the fixing substrate 154 is attached to the outer surface of the side wall 103b of the cover 103, the reinforcing plate 161 may be completely covered by the fixing substrate 154. Accordingly, the pin fixing groove 1615 formed in the reinforcing plate 161 is also covered by the fixing substrate 154 to the outside, and thus the boss pin 1015 may not be exposed to the outside.

Figure 5:
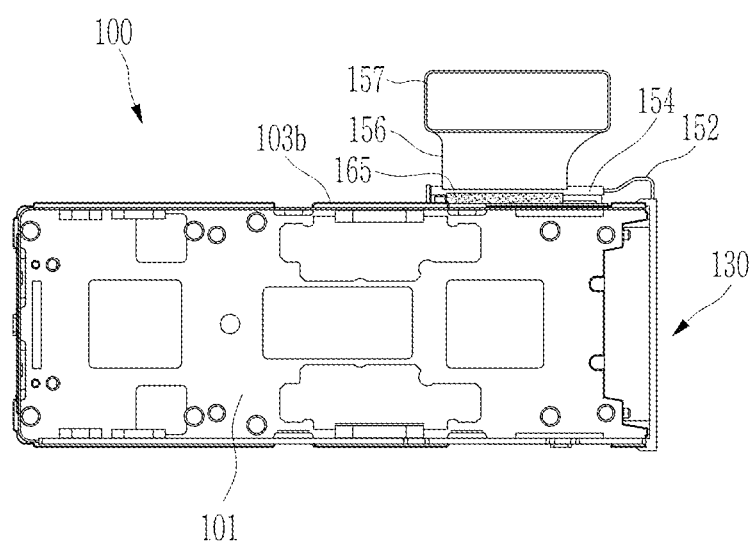
FIG. 5 illustrates a bottom view of a state in which a module circuit board of the camera module shown in FIG. 1 is attached to a cover.

FIG. 5 illustrates a bottom view of a state in which a module circuit board of the camera module shown in FIG. 1 is attached to a cover.

Referring to FIG. 5, After the fixing substrate 154 of the module circuit board 150 is attached to the outer surface of the side wall 103b of the cover 103, it may be fixed by additionally injecting an adhesive bond 165 between the flexible circuit portion 156 extending from the fixing substrate 154 and the outer surface of the side wall 103b of the cover 103. That is, the fixing substrate 154 is primarily attached to the outer surface of the side wall 103b of the cover 103 through the conductive adhesive 163 applied to the reinforcing plate 161, and the portion thereof adjacent to the fixing substrate 154 of the flexible circuit portion 156 may be secondarily attached to the outer surface of the side wall 103b of the cover 103 by using the adhesive bond 165. Accordingly, the module circuit board 150 may be more firmly coupled to the side wall 103b of the cover 103.

Figure 6:
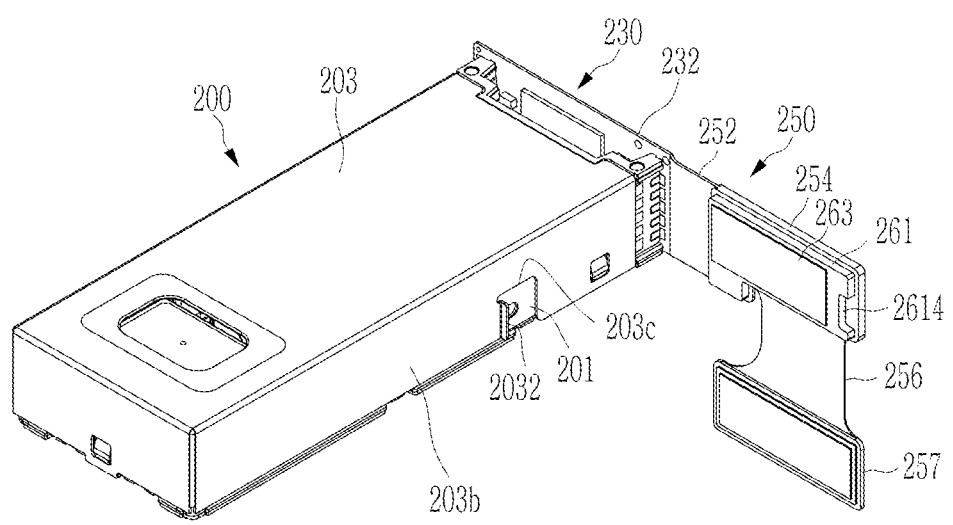
FIG. 6 illustrates a perspective view of an appearance of a camera module according to another embodiment.
Figure 7:
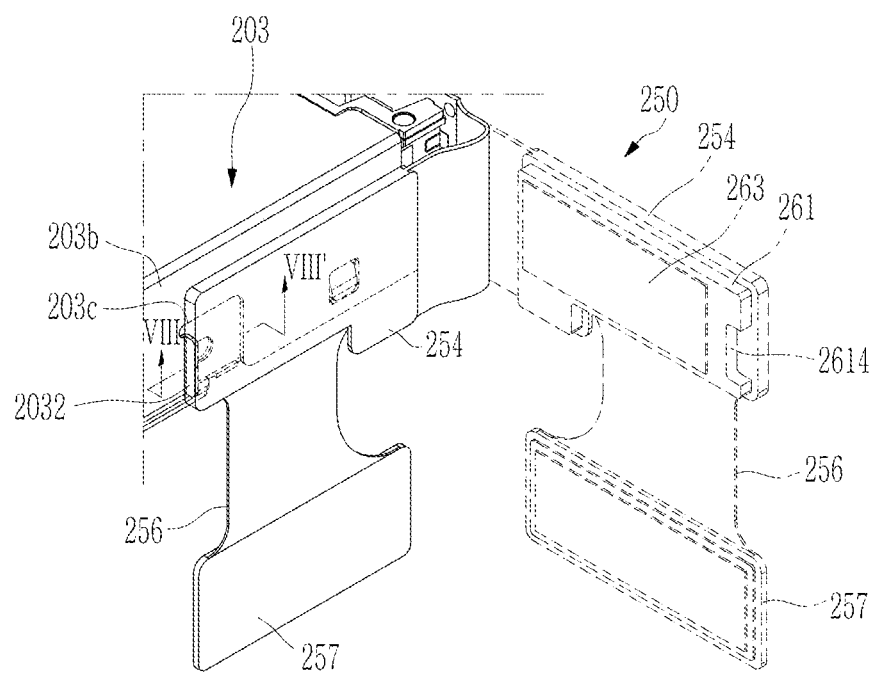
FIG. 7 illustrates a partial perspective view of a state in which a module circuit board of the camera module shown in FIG. 6 is attached to a cover.
Figure 8:
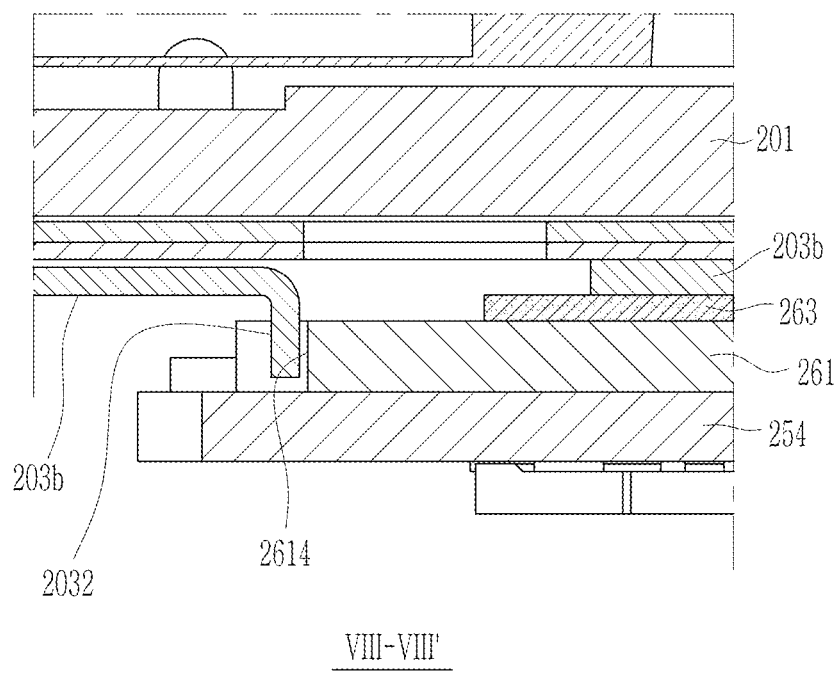
FIG. 8 illustrates a cross-sectional view taken along line VIII-VIII' of FIG. 7.

FIG. 6 illustrates a perspective view of an appearance of a camera module according to another embodiment, FIG. 7 illustrates a partial perspective view of a state in which a module circuit board of the camera module shown in FIG. 6 is attached to a cover, and FIG. 8 illustrates a cross-sectional view taken along line VIII-VIII' of FIG. 7.

Referring to FIG. 6 to FIG. 8, in a camera module 200 according to the present embodiment, a module circuit board 250 may be extended from an image sensor module 230 to be fixed to the outside of a housing 201, and may be further extended to be connected to an external circuit.

That is, the module circuit board 250 includes a connection portion 252 and a fixing substrate 254 that are connected to each other, and in this case, the connection portion 252 may be connected to a substrate 232 of the image sensor module 230, and the fixing substrate 254 may be fixed to an outer surface of a cover 203 covering the outside of the housing 201. In addition, the module circuit board 250 may include a flexible circuit portion 256 extending from the fixing substrate 254 and a connector substrate 257 connected thereto to be connected to an external circuit or device (not shown).

The cover 203 includes a side wall 203b covering a side surface of the housing 201, and a protrusion guide 2032 may be formed to protrude outward from the side wall 203b. The cover 203 may be a metal shield can, and the protrusion guide 2032 may be formed by bending one edge of a cutout 203c partially cut out of the side wall 203b of the metal shield can to the outside.

The fixing substrate 254 of the module circuit board 250 may be attached to an outer surface of the side wall 203b of the cover 203 by bending the connection portion 252, and in this case, a reinforcing plate 261 may be interposed between the fixing substrate 254 and the outer surface of the side wall 203b of the cover 203. The reinforcing plate 261 may be made of a rigid metal plate and fixed to one surface of the fixing substrate 254, and a conductive adhesive 263 may be disposed on one surface of the reinforcing plate 261 facing the side wall 203b of the cover 203. Accordingly, the fixing substrate 254 may be attached by the conductive adhesive 263 by interposing the reinforcing plate 261 between the fixing substrate 254 and the outer surface of the cover 203 that is a metal shield can, so that a ground connection of the module circuit board 250 may be made.

The protrusion guide 2032 may be disposed on the side wall 203b of the cover 203 and spaced apart from the image sensor module 230 in the optical axis direction, and the fixing substrate 254 of the module circuit board 250 may be disposed between the image sensor module 230 and the protrusion guide 2032. The reinforcing plate 261 includes a first edge that is parallel to the light incident direction (the second axis direction, the y-axis direction of the drawing) and is adjacent to the connection part 152, and a second edge that is parallel to and faces the first edge, and in this case, a length of the protrusion guide 2032 parallel to the light incident direction may be shorter than a length of the second edge of the reinforcing plate 261 parallel to the light incident direction.

The reinforcing plate 261 includes a guide groove 2614 in the second edge, and the guide groove 2614 may be recessed toward the center of the reinforcing plate 261 in the planar direction to accommodate the protrusion guide 2032. That is, when the fixing substrate 254 is attached to the outer surface of the side wall 203b of the cover 203, the protrusion guide 2032 may be inserted into the guide groove 2614 to be accommodated. Thus, the protrusion guide 2032 may be utilized to guide a fixing position of the fixing substrate 254.

The planar direction may be set as a direction parallel to a surface of the reinforcing plate 261.

A planar area of the reinforcing plate 261 is formed to be smaller than that of the fixing substrate 254, and thus, by interposing the reinforcing plate 261, when the fixing substrate 254 is attached to the outer surface of the side wall 203*b* of the cover 203, the reinforcing plate 261 may be completely covered by the fixing substrate 254. Accordingly, the guide groove 2614 formed in the reinforcing plate 261 is also covered by the fixing substrate 254 to the outside, and thus the protrusion guide 2032 may not be exposed to the outside.

Figure 9:
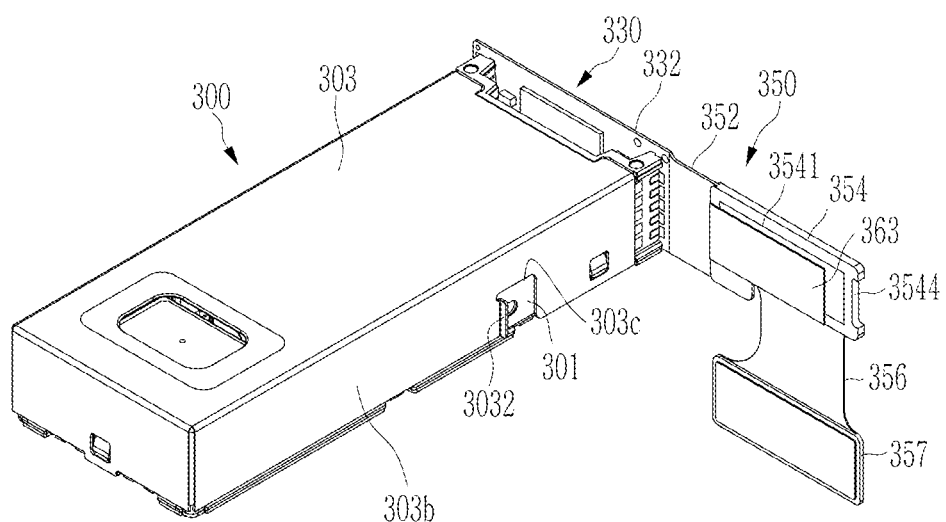
FIG. 9 illustrates a perspective view of an appearance of a camera module according to another embodiment.
Figure 10:
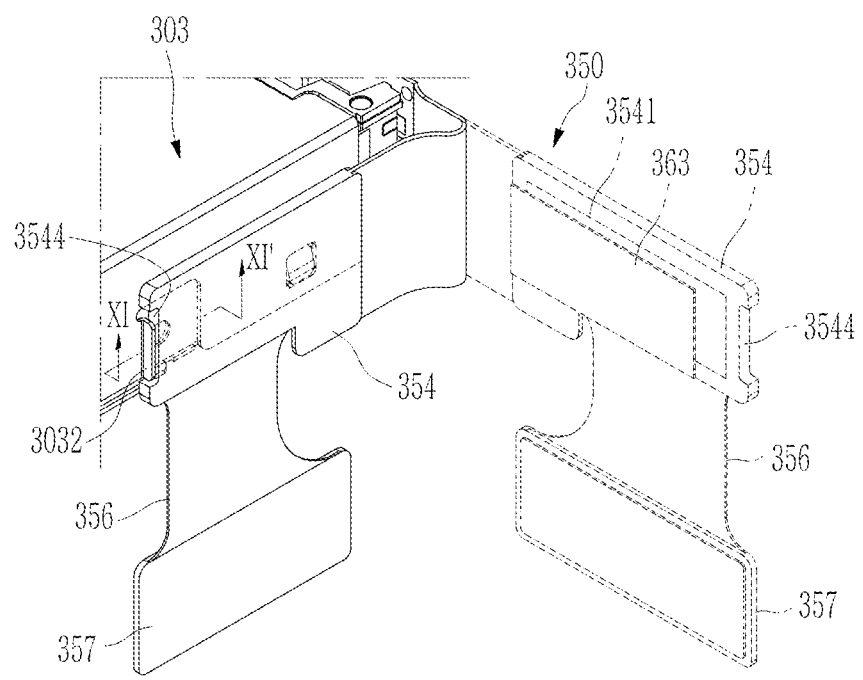
FIG. 10 illustrates a partial perspective view of a state in which a module circuit board of the camera module shown in FIG. 9 is attached to a cover.
Figure 11:
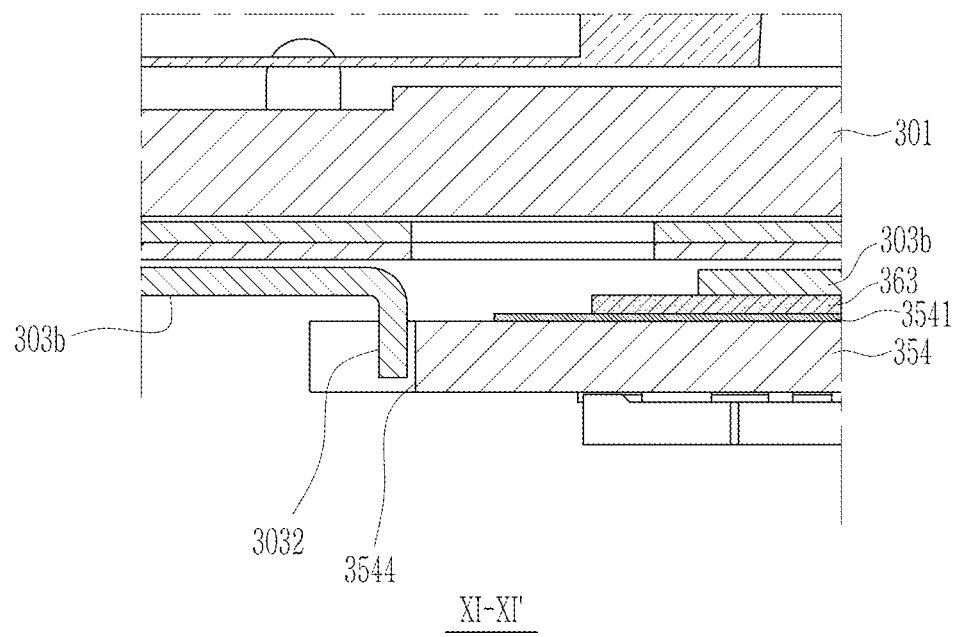
FIG. 11 illustrates a cross-sectional view taken along line XI-XI' of FIG. 10.

FIG. 9 illustrates a perspective view of an appearance of a camera module according to another embodiment, FIG. 10 illustrates a partial perspective view of a state in which a module circuit board of the camera module shown in FIG. 9 is attached to a cover, and FIG. 11 illustrates a cross-sectional view taken along line XI-XI' of FIG. 10.

Referring to FIG. 9 to FIG. 11, in a camera module 300 according to the present embodiment, a module circuit board 350 may be extended from an image sensor module 330 to be fixed to the outside of a housing 301, and may be further extended to be connected to an external circuit or device.

That is, the module circuit board 350 includes a connection portion 352 and a fixing substrate 354 that are connected to each other, and in this case, the connection portion 352 may be connected to a substrate 332 of the image sensor module 330, and the fixing substrate 354 may be fixed to an outer surface of the cover 303 covering the outside of the housing 301. In addition, the module circuit board 350 may include a flexible circuit portion 356 extending from the fixing substrate 354 and a connector substrate 357 connected thereto to be connected to an external circuit or device (not shown).

The cover 303 includes a side wall 303*b* covering a side surface of the housing 301, and a protrusion guide 3032 may be formed to protrude outward from the side wall 303*b*. The cover 303 may be a metal shield can, and the protrusion guide 3032 may be formed by bending one edge of a cutout 303*c* partially cut out of the side wall 303*b* of the metal shield can to the outside.

The fixing substrate 354 of the module circuit board 350 may be attached to the outer surface of the side wall 303*b* of the cover 303 by bending the connection portion 352, and in this case, the fixing substrate 354 may include a guide groove 3544 in one edge thereof to accommodate the protrusion guide 3032.

That is, the fixing substrate 354 includes a third edge that is parallel to the light incident direction and adjacent to the connection portion 352 and a fourth edge parallel to and facing the third edge, and the guide groove 3544 may be recessed from the fourth edge of the fixing substrate 354 toward the center of the fixing substrate 354 in the planar direction. Accordingly, when the fixing substrate 354 is attached to the outer surface of the side wall 303*b* of the cover 303, the protrusion guide 3032 may be inserted into the guide groove 3544 to be accommodated. Thus, the protrusion guide 3032 may be utilized to guide a fixing position of the fixing substrate 354. The planar direction may be set as a direction parallel to a surface of the fixing substrate 354.

The fixing substrate 354 may include a ground pattern 3541 on the surface of the fixing substrate 354 facing the outer surface of the side wall 303*b* of the cover 303, and it may be attached to the outer surface of the side wall 303*b* of the cover 303 by interposing a conductive adhesive 363 therebetween. That is, since the ground pattern 3541 of the fixing substrate 354 is adhered to the cover 303 that is the metal shield can through the conductive adhesive 363, a ground connection of the module circuit board 350 may be made.

The protrusion guide 3032 may be disposed on the side wall 303*b* of the cover 303 and spaced apart from the image sensor module 330 in the optical axis direction, and the fixing substrate 354 of the module circuit board 350 may be disposed between the image sensor module 330 and the protrusion guide 3032. Accordingly, the protrusion guide 3032 may be exposed to the outside by the guide groove 3544 formed in the fixing substrate 354.

Figure 12:
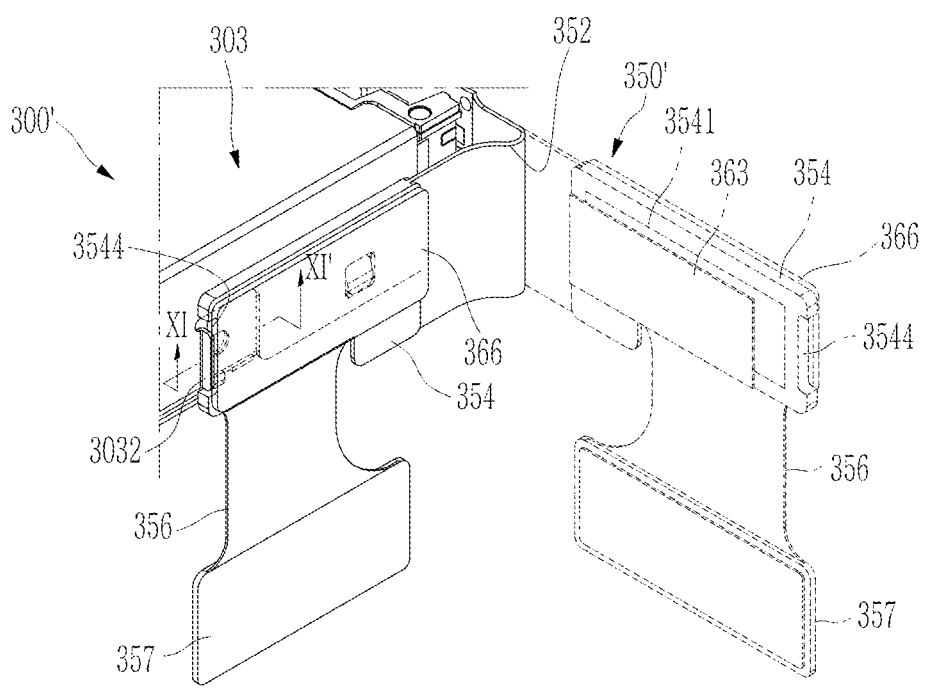
FIG. 12 illustrates a partial perspective view of a state in which a module circuit board of the camera module according to another embodiment is attached to a cover.

FIG. 12 illustrates a partial perspective view of a state in which a module circuit board of the camera module according to another embodiment is attached to a cover.

Referring to FIG. 12, a camera module 300' according to the present embodiment includes the constituent elements of the camera module 300 described with reference to FIG. 9 to FIG. 11, and it may further include a reinforcing plate 366 attached to the outside of a fixing substrate 354 of a module circuit board 350'. Accordingly, duplicate descriptions of the same constituent elements will be omitted.

The fixing substrate 354 of the module circuit board 350' may be attached to an outer surface of a side wall 303*b* of a cover 303 by bending a connection portion 352 of the module circuit board 350', and in this case, the fixing substrate 354 may include a guide groove 3544 in one edge thereof to accommodate a protrusion guide 3032.

The reinforcing plate 366 may be attached to an outward-facing surface of the fixing substrate 354, and the reinforcing plate 366 may be a rigid metal plate. By attaching the reinforcing plate 366, the strength of the fixing substrate 354 may be further reinforced.

In the embodiments of the camera module described above, by fixing a module circuit board for connection to an external circuit or device to a cover of the camera module and grounding the module circuit board at the same time, a structure of the module circuit board may be robustly and simply implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing comprising an inner space;
   a cover covering the housing and comprising a side wall covering a side surface of the housing, and a protrusion guide protruding outward from the side wall of the cover;
   a folded module disposed in the inner space of the housing and comprising a reflective member configured to change a path of light incident from outside the camera module in a light incidence direction by reflecting the light in an optical axis direction in the inner space of the housing;

a lens module disposed in the inner space of the housing and comprising a lens barrel, and a plurality of lenses disposed in the lens barrel and arranged in the optical axis direction so that the light reflected by the reflective member in the optical axis direction in the inner space of the housing passes through the plurality of lenses;

an image sensor module mounted on the housing and comprising an image sensor configured to detect the light passing through the plurality of lenses;

a reinforcing plate disposed on an outer surface of the side wall of the cover so that one edge of the reinforcing plate is adjacent to the protrusion guide; and a module circuit board disposed outside of the housing and comprising a connection portion connected to the image sensor module, and a fixing substrate connected to the connection portion and disposed on the reinforcing plate so that the reinforcing plate is interposed between the fixing substrate and the outer surface of the side wall of the cover, wherein the connection portion is bent to enable the fixing substrate to be disposed on the reinforcing plate.

2. The camera module of claim 1, wherein the cover is a metal shield can.

3. The camera module of claim 2, wherein the protrusion guide is formed by bending one edge of a cutout partly cut out of the side wall of the metal shield can to protrude outward from the side wall of the metal shield can.

4. The camera module of claim 2, wherein the reinforcing plate is a rigid metal plate.

5. The camera module of claim 4, further comprising a conductive adhesive disposed between the reinforcing plate and the outer surface of the side wall of the metal shield can to adhere the reinforcing plate to the outer surface of the side wall of the metal shield can and ground the module circuit board to the metal shield can.

6. The camera module of claim 1, wherein the protrusion guide protruding outward from the side wall of the cover is spaced apart from the image sensor module in the optical axis direction, and the fixing substrate is disposed on the outer surface of the side wall of the cover between the image sensor module and the protrusion guide.

7. The camera module of claim 1, wherein the reinforcing plate comprises:

a first edge parallel to the light incidence direction and adjacent to the connection portion; and a second edge parallel to and facing the first edge and adjacent to the protrusion guide.

8. The camera module of claim 1, wherein the housing comprises a boss pin protruding through a cutout partially cut out of the side wall of the cover, and the reinforcing plate comprises a pin fixing groove accommodating the boss pin.

9. The camera module of claim 1, wherein the reinforcing plate comprises:

a first edge parallel to the light incidence direction and adjacent to the connection portion;

a second edge parallel to and facing the first edge; and a guide groove formed in the second edge, recessed toward a center of the reinforcing plate in a planar direction of the reinforcing plate perpendicular to the light incidence direction, and accommodating the protrusion guide.

10. The camera module of claim 9, wherein a length of the protrusion guide parallel to the light incidence direction is shorter than a length of the second edge parallel to the light incident direction.

11. A camera module comprising:

a housing comprising an inner space;

a cover covering the housing and comprising a side wall covering a side surface of the housing, and a protrusion guide protruding outward from the side wall of the cover;

a folded module disposed in the inner space of the housing and comprising a reflective member configured to change a path of light incident from outside the camera module in a light incidence direction by reflecting the light in an optical axis direction in the inner space of the housing;

a lens module disposed in the inner space of the housing and comprising a lens barrel, and a plurality of lenses disposed in the lens barrel and arranged in the optical axis direction so that the light reflected by the reflective member in the optical axis direction in the inner space of the housing passes through the plurality of lenses;

an image sensor module mounted on the housing and comprising an image sensor configured to detect the light passing through the plurality of lenses; and a module circuit board disposed outside of the housing and comprising a connection portion connected to the image sensor module, and a fixing substrate connected to the connection portion and disposed on an outer surface of the side wall of the cover, wherein the connection portion is bent to enable the fixing substrate to be disposed on the outer surface of the side wall of the cover, and the fixing substrate comprises a guide groove formed in one edge of the fixing substrate and accommodating the protrusion guide.

12. The camera module of claim 11, wherein the cover is a metal shield can.

13. The camera module of claim 12, wherein the protrusion guide is formed by bending one edge of a cutout partly cut out of the side wall of the metal shield can to protrude outward from the side wall of the metal shield can.

14. The camera module of claim 12, wherein the fixing substrate comprises a ground pattern exposed on a surface of the fixing substrate facing the outer surface of the side wall of the metal shield can, and the camera module further comprises a conductive adhesive disposed between the ground pattern and the outer surface of the side wall of the metal shield can to adhere the fixing substrate to the outer surface of the side wall of the metal shield can and ground the module circuit board to the metal shield can.

15. The camera module of claim 11, wherein the fixing substrate comprises:

a third edge parallel to the light incidence direction and adjacent to the connection portion; and a fourth edge parallel to and facing the third edge, wherein the guide groove is formed in the fourth edge and recessed toward a center of the fixing substrate in a planar direction of the fixing substrate perpendicular to the light incidence direction.

16. The camera module of claim 11, further comprising a rigid reinforcing plate disposed on a surface of the fixing substrate facing away from the outer surface of the side wall of the cover.

17. A camera module comprising:
a housing comprising an inner space;
a cover covering the housing and comprising a side wall covering a side surface of the housing, and a protrusion guide protruding outward from the side wall of the cover;
a folded module disposed in the inner space of the housing and comprising a reflective member configured to change a path of light incident from outside the camera module in a light incidence direction by reflecting the light in an optical axis direction in the inner space of the housing;
a lens module disposed in the inner space of the housing and comprising a lens barrel, and a plurality of lenses disposed in the lens barrel and arranged in the optical axis direction so that the light reflected by the reflective member in the optical axis direction in the inner space of the housing passes through the plurality of lenses;
an image sensor module mounted on the housing and comprising an image sensor configured to detect the light passing through the plurality of lenses; and
a module circuit board disposed outside of the housing and comprising a connection portion connected to the image sensor module, and a fixing substrate connected to the connection portion and supported on an outer surface of the side wall of the cover at a position determined by the protrusion guide,
wherein the connection portion is bent to enable the fixing substrate to be supported on the outer surface of the side wall of the cover.

18. The camera module of claim 17, further comprising a reinforcing plate disposed between the fixing substrate and the outer surface of the side wall of the cover,
wherein the fixing substrate is disposed on the reinforcing plate.

19. The camera module of claim 18, further comprising a conductive adhesive adhering the reinforcing plate to the outer surface of the side wall of the cover.

20. The camera module of claim 18, wherein the housing comprises a boss pin protruding through a cutout partially cut out of the side wall of the cover,
the reinforcing plate comprises a pin fixing groove formed in an edge of the reinforcing plate parallel to the light incidence direction and accommodating the boss pin, and
a width of the pin fixing groove in a direction parallel to the light incidence direction is greater than a width of the boss pin in the direction parallel to the light incidence direction and less than a length of the protrusion guide in the direction parallel to the light incidence direction.

21. The camera module of claim 18, wherein the reinforcing plate comprises a guide groove formed in an edge of the reinforcing plate parallel to the light incidence direction and accommodating the protrusion guide, and
a width of the guide groove in a direction parallel to the light incidence direction is greater than a length of the protrusion guide in the direction parallel to the light incidence direction and less than a length of the reinforcing plate in the direction parallel to the light incidence direction.

22. The camera module of claim 17, wherein the fixing substrate comprises a guide groove formed in an edge of the fixing substrate parallel to the light incidence direction and accommodating the protrusion guide, and
a width of the guide groove in a direction parallel to the light incidence direction is greater than a length of the protrusion guide in the direction parallel to the light incidence direction and less than a length of the fixing substrate in the direction parallel to the light incidence direction.

23. The camera module of claim 22, further comprising a conductive adhesive adhering the fixing substrate to the outer surface of the side wall of the cover.

24. The camera module of claim 23, wherein the fixing substrate comprises a ground pattern exposed on a surface of the fixing substrate facing the outer surface of the side wall of the cover, and
the conductive adhesive adheres the ground pattern to the outer surface of the side wall of the cover.

25. The camera module of claim 22, further comprising a rigid reinforcing plate disposed on a surface of the fixing substrate facing away from the outer surface of the side wall of the cover.

* * * * *